F. O. BUTLER.
TRUCK.
APPLICATION FILED FEB. 15, 1909.

944,663.

Patented Dec. 28, 1909.
2 SHEETS—SHEET 1.

Witnesses
Thos. Rosemann
J. A. L. Mulhall

Frank O. Butler, Inventor
By Joshua R. H. Potts,
Attorney

F. O. BUTLER.
TRUCK.
APPLICATION FILED FEB. 15, 1909.

944,663.

Patented Dec. 28, 1909.
2 SHEETS—SHEET 2.

Witnesses
Theo. Rosemann
J. A. F. Mulhall

Inventor
Frank O. Butler

By Joshua R. H. Potts
Attorney

UNITED STATES PATENT OFFICE.

FRANK O. BUTLER, OF PHILADELPHIA, PENNSYLVANIA, ASSIGNOR TO THE AMERICAN SUSPENSION RAILWAY COMPANY, OF PHILADELPHIA, PENNSYLVANIA.

TRUCK.

944,663.

Specification of Letters Patent. Patented Dec. 28, 1909.

Application filed February 15, 1909. Serial No. 477,891.

*To all whom it may concern:*

Be it known that I, FRANK O. BUTLER, a citizen of the United States, residing at Philadelphia, in the county of Philadelphia and State of Pennsylvania, have invented certain new and useful Improvements in Trucks, of which the following is a specification.

The invention relates to improvements in trucks, and more particularly to trucks designed for use on suspension railways, the object of the invention being to provide means for preventing the truck from jumping off the track, and means for preventing a sidewise movement of the truck relative to the track.

A further object is to provide a truck of this character with arms positioned so as to move just over the track and provided with depending lugs or flanges longer than the flanges of the wheels, so that in the event the wheels should jump from the track, the flanges from the said arms will prevent lateral movement of the truck, as they will engage the rail.

A further object is to provide a truck with wheels or rollers mounted to move below a flange or angle rails, so as to prevent any upward movement of the truck, and hence insure its retention on the track.

With these and other objects in view, the invention consists in certain novel features of construction, and combinations, and arrangements of parts as will be more fully hereinafter described and pointed out in the claims.

Figure 1:
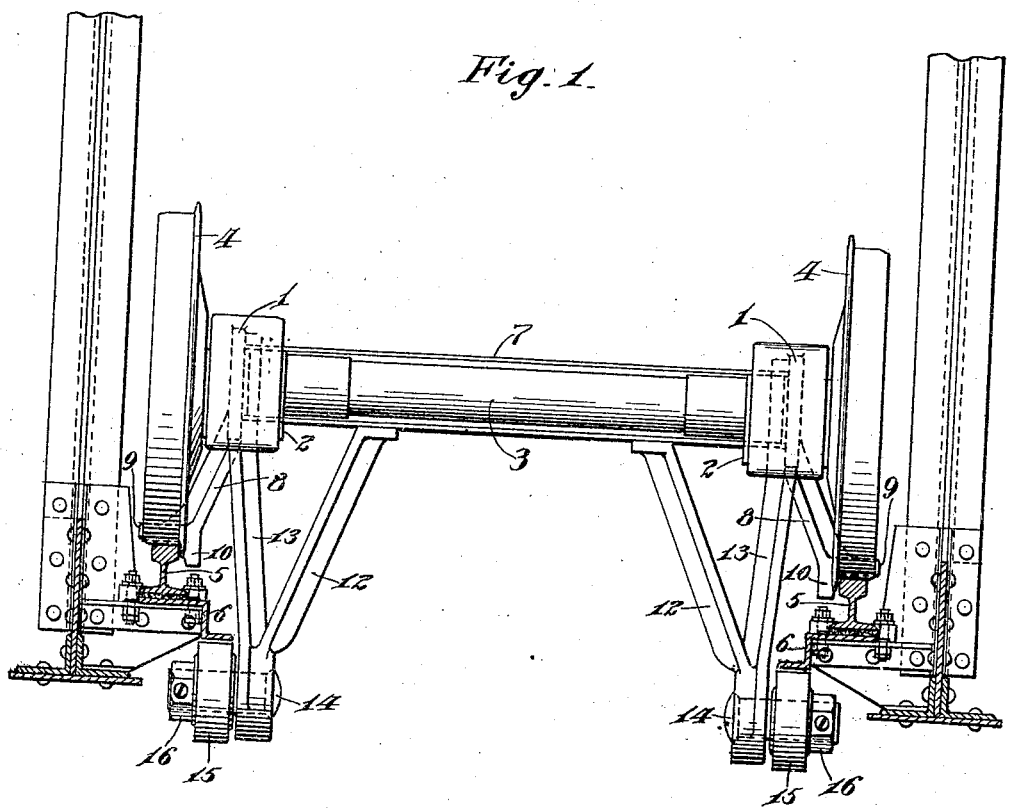
Figure 2:
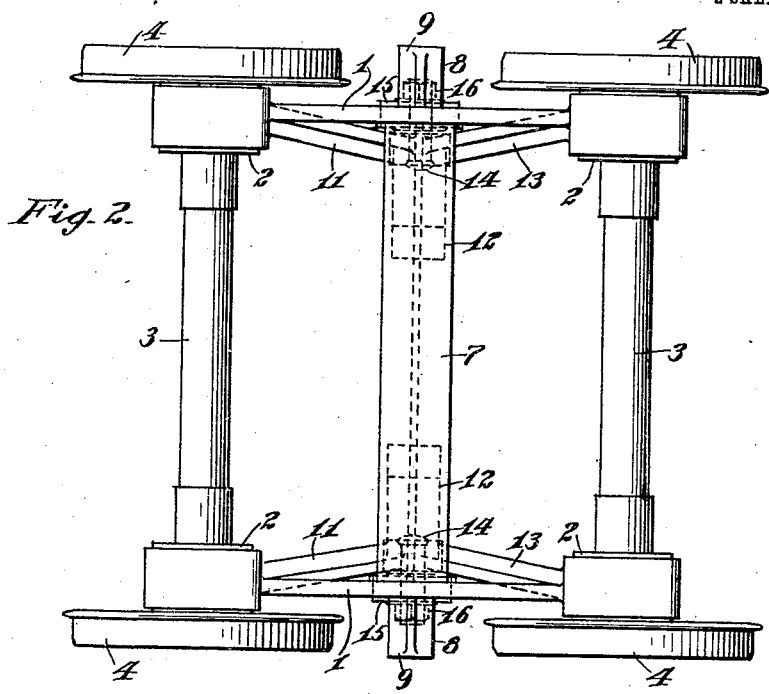
Figure 3:
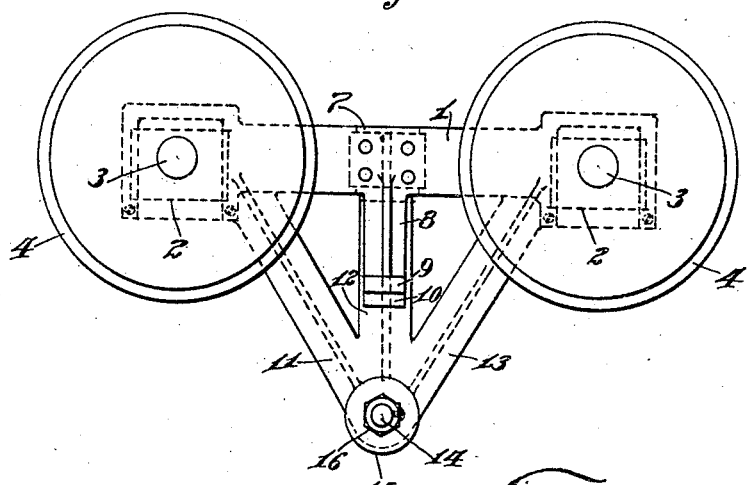

In the accompanying drawings, Figure 1, is an end view. Fig. 2, is a top plan view, and Fig. 3, is a view in side elevation.

A truck comprises side frames 1, having yoked ends to receive the journal boxes 2, supported on the axles 3 of wheels 4. The wheels 4 are mounted to run upon the rails 5 supported by a suspension railway structure of any desired form, and having an angle rail 6 secured thereto and positioned as clearly shown in Fig. 1. The side frames of the trucks are connected by a bolster 7, and to the center of the side frames, outwardly flared depending arms 8 are secured and made with a flange 9 at their ends positioned just above the rails 5, and also made with depending flanges 10 positioned at the inner edges of the rails. These flanges 10 are appreciably longer than the wheel flanges, so that in the event the wheels should jump from the track, the flanges 10 will engage the rails and prevent sidewise movement of the truck, guiding the wheels back to position on the rails.

Depending frameworks comprising three depending arms 11, 12 and 13 are secured to the truck frames and converge at their lower ends forming a bearing for a journal pin 14, on which latter a wheel or roller 15 is mounted and positioned beneath the angle rails 6 and held against displacement by lock nuts 16. It is to be understood of course, there are two of these frames and wheels, one on each side of the truck, so as to position a roller or wheel 15 beneath the rails 6 at one side of the structure. These wheels are so positioned as not to engage the rails 6, unless the truck moves upward, when they will engage the rails and limit upward movement of the truck, and absolutely preventing possibility of the trucks leaving the track.

A great many slight changes might be made in the general form and arrangement of parts described without departing from the invention, and hence it is not restricted to the precise details set forth.

Having fully described the invention what is claimed as new and is desired to cover by Letters Patent is:

1. A truck of the character described, comprising side frames and wheels supporting the same, outwardly and downwardly projecting rigid arms fixed to the side frames, said arms constructed to overlap the upper and inner sides of the rails to prevent lateral movement of the truck, relative to the rails.

2. A truck comprising side frames, a bolster connecting the side frames, rollers supporting the side frames, outwardly and downwardly projecting arms on said side frames at their center, flanges at the ends of said arms at an angle to each other, other arms projecting downwardly from said side frames and rollers carried by said last mentioned arms in a plane below the plane of the flanged ends of said first mentioned arms substantially as and for the purpose set forth.

3. A truck comprising side frames, a bolster connecting the side frames, rollers supporting the side frames, outwardly and downwardly projecting arms on said side frames at their center, flanges at the ends of said arms at an angle to each other, other arms projecting downwardly from said side frames and rollers carried by said last mentioned arms in a plane below the plane of the flanged ends of said first mentioned arms, and inclined strengthening arms connecting the last mentioned arms with the bolster, substantially as and for the purpose set forth.

4. The combination with a suspension railway structure, having truck supporting rails thereon, and a second pair of rails on said structure in a plane below the truck supporting rails, of truck side frames, wheels supporting the side frames and adapted to run on the truck supporting rails, depending arms on said side frames, rollers carried by said arms and movable below the last mentioned pair of rails, and other arms secured to said side frames and projecting over the upper and inner faces of the first mentioned rails, substantially as and for the purpose set forth.

5. A truck of the character described, comprising side frames, depending arms on said side frames at their centers having depending flanges, and laterally projecting webs or rims, depending arms at both sides of said frame converging to a central point, and rollers carried by said frames at their lower ends constructed and adapted to move below fixed portions of the railway structure, and preventing vertical movement of the trucks on their rails.

In testimony whereof I have signed my name to this specification in the presence of two subscribing witnesses.

FRANK O. BUTLER.

Witnesses:
GEO. W. SCHREINER,
C. J. CARROLL.